United States Patent Office 3,326,895
Patented June 20, 1967

3,326,895
AZIRIDINE PROCESS
William P. Coker, Lake Jackson, Tex., assignor to The Dow Chemical Company, Midland, Mich., a corporation of Delaware
No Drawing. Filed Feb. 15, 1965, Ser. No. 432,806
4 Claims. (Cl. 260—239)

This invention relates to improved processes for making an aziridine by the reaction of a vicinal dihalide or equivalent reactant with ammonia or an aliphatic primary amine.

It is known that an aziridine can be made according to the following reaction

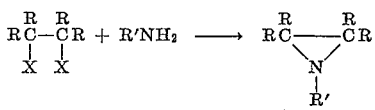

wherein each R is H or an inert organic radical, R' is H or an inert aliphatic radical and each X is a halogen, a sulfate ester group or a sulfonic acid ester group (see, for instance, British Patent 923,528 and the copending application of Gordon R. Miller et al. Ser. No. 228,029, filed Oct. 3, 1962). This reaction is conducted in the liquid state at a temperature below about 200° C., under at least the autogenous pressure and in the presence of a suitable acid acceptor.

It has now been discovered that the above process can be unexpectedly accelerated if it is conducted under a high pressure of at least about 5,000 p.s.i., and preferably at least 10,000 p.s.i. While it is a common expedient to accelerate reactions involving a gas phase by use of increased pressure, such expedient is ordinarily ineffective in reactions having no significant gas phase. Liquids being essentially incompressible, increased pressure would not be expected to increase the rate or reaction.

The preferred process to which the present invention is applied is that disclosed in the above Miller et al. application, which application is incorporated herein by reference; i.e., the process wherein the following reaction is effected:

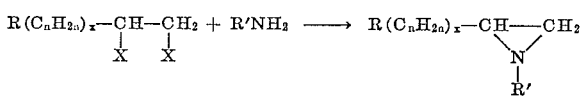

wherein R is H or phenyl, R' is H or an inert aliphatic radical, $n$ is an integer 1–10, $x$ is an integer 0–1 and each X is Cl, Br, —OSO$_2$R'' or —OSO$_2$AX' wherein R'' is a hydrocarbon radical having up to 10 carbons, A is a vicinal alkylene radical of 2–4 carbons and X' is Cl or Br. This reaction is conducted in the liquid state at a temperature below about 200° C. and in the presence of a suitable acid acceptor. The latter may be an excess of the reactant R'NH$_2$ or another amine (preferably tertiary) or an inorganic base such as an alkali or alkaline earth metal oxide or hydroxide.

The improved process of the invention can be carried out batchwise or continuously, the latter being preferred. In a preferred embodiment, the mixture of reactants is pumped continuously through a tubular reactor at the desired temperature and pressure and the effluent stream is separated into its components by any suitable method. Because of the high reactivity of aziridines, it is preferred to effect the separation under mild conditions whereby secondary and side reactions are minimized. In a preferred separation technique, the reactor effluent is brought to a temperature below 100° C., and preferably below 50° C., any solid is separated and the liquid is distilled at low temperature, under reduced pressure if necessary, to remove, first, any unconverted reactant R'NH$_2$, second, the desired aziridine and, third, any unconverted reactant

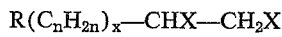

The residue then consists largely or entirely of polymers and other byproducts.

The practice of the invention is illustrated by the following examples.

*General procedure*

The reactor consisted of 400 ft. of 3/32 inch I.D. high pressure stainless steel tubing in the form of a coil and immersed in a water bath. The reactants were mixed and pumped through the coil against an automatic control valve at the exit, the valve being set for any desired pressure. The composition of the exit stream was determined by vapor-phase chromatography. In each experiment, the reactants were ethylene dichloride (EDC) and ammonia in the indicated molar ratio, the excess ammonia serving as the acid acceptor. Contact time in the reactor was controlled by adjusting the rate of pumping the feed. Results were recorded in terms of yield of aziridine based on EDC consumed and time required to achieve a predetermined percentage conversion of EDC. Results of some typical experiments are shown in the following table:

TABLE I

| Example | Ratio NH$_3$/EDC | Temp. (° C.) | Pressure (p.s.i.) | Yield (percent) | Time (mins.) |
|---|---|---|---|---|---|
| 1 | 20 | 60 | 12,000 | 51 | [1] 35 |
| 2 | 20 | 60 | 380 | 50 | [1] 210 |
| 3 | 20 | 75 | 12,000 | 64 | [2] 15.5 |
| 4 | 20 | 75 | 540 | 56 | [2] 60 |
| 5 | 40 | 92 | 12,000 | 63 | [3] 5.6 |
| 6 | 40 | 92 | 825 | 56 | [3] 21 |
| 7 | 40 | 100 | 5,000 | 26 | [4] 10.2 |
| 8 | 40 | 100 | 20,000 | 41 | [4] 2.3 |

[1] Time to achieve 50 percent conversion of EDC.
[2] Time to achieve 40 percent conversion of EDC.
[3] Time to achieve 37 percent conversion of EDC.
[4] Time to achieve 58 percent conversion of EDC.

As might be expected, maximum yields are obtained at low conversions. Due to polymerization and side reactions, prolongation of the reaction time or an increase in the reaction temperature, while raising the conversion, results in lower yield. This is illustrated in the following table. This shows the progress of the reaction in Examples 7 and 8, shown above.

TABLE II

| Reaction Time (mins.) | Yield, Percent | | Percent Conversion, EDC | |
|---|---|---|---|---|
|  | Ex. 7 | Ex. 8 | Ex. 7 | Ex. 8 |
| 1.4 |  | 65.7 |  | 35.2 |
| 2.0 |  | 50.0 |  | 52.6 |
| 2.3 |  | 41.2 |  | 58.4 |
| 3.1 |  | 24.2 |  | 78.5 |
| 3.4 |  | 20.3 |  | 79.6 |
| 8.2 | 36.6 |  | 40.8 |  |
| 10.2 | 26.1 |  | 58.0 |  |
| 12.3 | 10.9 |  | 73.4 |  |

The increased reaction rate illustrated in the foregoing examples is also observed when the ammonia is replaced with a primary aliphatic amine, such as, for example, methylamine, ethylamine, butylamine, ethanolamine, 2-methoxyethylamine or cyclohexylamine, or when instead of ethylene chloride, one uses other vicinal alkylene halides, such as, ethylene bromide or bromochloride, propylene chloride, bromide or bromochloride, 1,2- or 2,3-butylene chloride, bromide or bromochloride or the corresponding alkylene halosulfates, halosulfonates, or disulfates, disulfonates or sulfate-sulfonate, or the like.

I claim:

1. In the process wherein an aziridine is made by the reaction

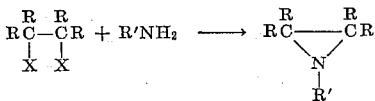

wherein each R is independently selected from the group consisting of H and inert organic radicals, R' is selected from the group consisting of H and inert aliphatic radicals and each X is selected from the group consisting of halogens and sulfate ester and sulfonate ester groups, said reaction being effected in the liquid state, at a temperature below 200° C. and in the presence of an acid acceptor, the improvement of effecting the reaction under a pressure of at least about 12,000 p.s.i.

2. In the process wherein an aziridine having the formula

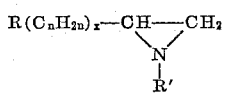

is made by the reaction of a vicinal alkylene halide having the formula

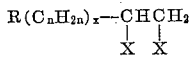

with an amine having the formula

wherein in the above formulas R is H or phenyl, R' is H or an inert aliphatic radical, $n$ is an integer 1–10, $x$ is 0 or 1 and each X is Cl or Br, said reaction being effected in the liquid state, at a temperature below 200° C. and in the presence of an acid acceptor, the improvement of effecting the reaction under a pressure of at least about 12,000 p.s.i.

3. The process of claim 2 wherein $n$ is 1–2, R is H and R' is H, lower alkyl, 2-hydroxyalkyl, 2-alkoxyalkyl or cyclohexyl.

4. The process of claim 2 wherein the alkylene halide is ethylene chloride and the compound R'NH$_2$ is ammonia.

References Cited

UNITED STATES PATENTS 3,205,224  9/1965  Dix _____ 260—239

FOREIGN PATENTS 662,407  4/1963  Canada.

ALEX MAZEL, *Primary Examiner.*

ALTON D. ROLLINS, *Assistant Examiner.*